US008453050B2

(12) United States Patent
Dias et al.

(10) Patent No.: US 8,453,050 B2
(45) Date of Patent: May 28, 2013

(54) METHOD AND APPARATUS FOR CREATING AND EDITING ELECTRONIC DOCUMENTS

(75) Inventors: Daniel M. Dias, Mohegan Lake, NY (US); Thomas Y. Kwok, Washington Township, NJ (US); Thao N. Nguyen, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 12/164,572

(22) Filed: Jun. 30, 2008

(65) Prior Publication Data

US 2008/0263438 A1      Oct. 23, 2008

Related U.S. Application Data

(63) Continuation of application No. 11/476,354, filed on Jun. 28, 2006, now abandoned.

(51) Int. Cl.
*G06F 17/00* (2006.01)
*H04L 9/32* (2006.01)

(52) U.S. Cl.
USPC ............................ 715/239; 715/234; 713/176

(58) Field of Classification Search
USPC ........... 715/234, 236, 239, 249–250; 713/176
See application file for complete search history.

(56) References Cited

U.S. PATENT DOCUMENTS

| 5,121,945 | A | 6/1992 | Thomson et al. |
| 5,129,061 | A | 7/1992 | Wang et al. |
| 5,222,236 | A | 6/1993 | Potash et al. |
| 5,225,978 | A | 7/1993 | Petersen et al. |
| 5,414,974 | A | 5/1995 | Van de Ven et al. |
| 5,677,835 | A | 10/1997 | Carbonell et al. |
| 5,706,475 | A | 1/1998 | Entressangle et al. |
| 5,926,552 | A | 7/1999 | McKeon |
| 5,991,709 | A | 11/1999 | Schoen |
| 6,076,088 | A | 6/2000 | Paik et al. |
| 6,154,756 | A | 11/2000 | Hearn et al. |
| 6,263,335 | B1 | 7/2001 | Paik et al. |

(Continued)

FOREIGN PATENT DOCUMENTS

| EP | 0173122 B1 | 3/1986 |
| EP | 0459792 A2 | 12/1991 |

(Continued)

OTHER PUBLICATIONS

International Association of Contract and Commercial Managers, http://www.iaccm.com, (list of commercially available contract software products), downloaded Feb. 8, 2008, 4 pages.

(Continued)

*Primary Examiner* — Chau Nguyen
(74) *Attorney, Agent, or Firm* — Preston J. Young, Esq.

(57) ABSTRACT

In one embodiment, the present invention is a method and apparatus for creating and editing electronic documents. One embodiment of the inventive method involves generating an electronic document in a first document format type, in accordance with one or more user-specified parameters, and converting the electronic document from the first document format type into a second document format type, in accordance with a user instruction to finalize the electronic document. In one embodiment, the first document format type is a structured document format type, such as hypertext markup language or extensible markup language, while the second document format type is a secure document format type such as portable document format.

17 Claims, 5 Drawing Sheets

U.S. PATENT DOCUMENTS

| | | | |
|---|---|---|---|
| 6,418,448 | B1 | 7/2002 | Sarkar |
| 6,605,122 | B1 | 8/2003 | Hearn et al. |
| 6,631,375 | B2 | 10/2003 | Jecha et al. |
| 6,684,369 | B1 | 1/2004 | Bernardo et al. |
| 7,281,018 | B1 | 10/2007 | Begun et al. |
| 8,078,878 | B2* | 12/2011 | Dietl .......................... 713/176 |
| 2002/0049705 | A1 | 4/2002 | Haviv-Segal et al. |
| 2002/0165882 | A1* | 11/2002 | Zettel et al. ............... 707/530 |
| 2003/0046639 | A1 | 3/2003 | Fai et al. |
| 2004/0030711 | A1 | 2/2004 | Roudot |
| 2004/0044542 | A1 | 3/2004 | Beniaminy et al. |
| 2004/0143509 | A1 | 7/2004 | De Almeida Prado et al. |
| 2004/0193631 | A1 | 9/2004 | Kumashio |
| 2004/0261016 | A1 | 12/2004 | Glass et al. |
| 2005/0097440 | A1 | 5/2005 | Lusk et al. |
| 2005/0262432 | A1 | 11/2005 | Wagner |
| 2005/0280855 | A1* | 12/2005 | Ono et al. ................. 358/1.13 |
| 2005/0289456 | A1 | 12/2005 | Bier |
| 2006/0161780 | A1* | 7/2006 | Berryman et al. .......... 713/176 |
| 2006/0253714 | A1* | 11/2006 | Ito .............................. 713/194 |

FOREIGN PATENT DOCUMENTS

| | | | |
|---|---|---|---|
| EP | 1351156 | A1 | 10/2003 |
| WO | WO-89/03092 | A1 | 4/1989 |
| WO | WO-94/06086 | A1 | 3/1994 |
| WO | WO-95/01385 | A1 | 5/1995 |
| WO | WO-96/27155 | A2 | 9/1996 |
| WO | WO-98/33294 | | 1/1998 |
| WO | WO-98/12616 | A2 | 3/1998 |
| WO | WO-98/16890 | A1 | 4/1998 |
| WO | WO-98/55945 | A1 | 12/1998 |
| WO | WO-00/45297 | A1 | 8/2000 |
| WO | WO-01/25024 | A1 | 4/2001 |
| WO | WO-01/79957 | A2 | 10/2001 |
| WO | WO-01/98928 | A2 | 12/2001 |
| WO | WO-02/07087 | A3 | 1/2002 |
| WO | WO-02/086774 | A1 | 10/2002 |
| WO | WO-03/019326 | A3 | 3/2003 |
| WO | WO-03/077154 | A2 | 9/2003 |
| WO | WO-2004/001581 | A1 | 12/2003 |
| WO | WO-2005/010727 | A2 | 2/2005 |
| WO | WO-2005/034012 | A2 | 4/2005 |
| WO | WO-2005/079493 | A2 | 9/2005 |

OTHER PUBLICATIONS

Y-H Tan and W. Thoen, DocLog: an electronic contract representation language, in Proc. of 35th Annual Hawaii Int'l Conf. on System Sciences, pp. 1069-1073, 2000.

F. Griffel, M. Boger, H. Weinreich, W. Lamersdorf and M. Merz, Electronic contracting with COSMOS—how to establish, negotiate and execute electronic contracts on the Internet, in Proc. of the 2nd Int'l Enterprise Distributed Object Computing Workshop, pp. 46-55, 1998.

T. Kwok and T. Nguyen, A Secure Electronic Contract Management and Process System Automated with Predefined Tasks, in Proc. of IEEE Int'l Conf. on e-Technology, e-Commerce and e-Service, IEEE Computer Society, pp. 276-281, 2005.

O. Perrin and C. Godart, An approach to implement contracts as trusted intermediaries, in Proc. of 1st IEEE Int'l Workshop on Electronic Contracting, pp. 71-78, 2004.

M. Iwaihara, H. Jiang and Y. Kambayashi, An integrated system for supporting problem solution in e-contract execution, in Proc. of 1st IEEE Int'l Workshop on Electronic Contracting, pp. 9-16, 2004.

L. Xu, Monitorable electronic contract, in Proc. of IEEE Int'l Conf. on E-Commerce, pp. 92-99, 2003.

Z. Milosevic, A. Josang, T. Dimitrakos and M.A. Patton, Discretionary enforcement of electronic contracts, in Proc .of 6th Int'l Enterprise Distributed Object Computing Conf., pp. 39-50, 2002.

A. Daskalopulu and T. Maibaum, Towards electronic contract performance, in Proc .of 12th Int'l Workshop on Database and Expert Systems Applications., pp. 771-777, 2001.

T. Kwok and T. Nguyen, An Automatic Electronic Contract Document Signing System in a Secure Environment, in Proc. of 7th IEEE Int'l Conf. on e-Commerce Technology, IEEE Computer Society, pp. 497-502, 2005.

M. Castellanos and U. Dayal, Facts: an approach to unearth legacy contracts, in Proc. of 1st IEEE Int'l Workshop on Electronic Contracting, pp. 40-45, 2004.

* cited by examiner

METHOD AND APPARATUS FOR CREATING AND EDITING ELECTRONIC DOCUMENTS

CROSS REFERENCE TO RELATED APPLICATIONS

This application is a continuation of U.S. patent application Ser. No. 11/476,354, filed Jun. 28, 2006, now abandoned entitled "METHOD AND APPARATUS FOR CREATING AND EDITING ELECTRONIC DOCUMENTS", which is herein incorporated by reference in its entirety.

BACKGROUND

The present invention relates generally to electronic business management, and relates more particularly to the creation, editing and mining of electronic business documents. Specifically, the present invention provides a method and apparatus for creating and editing electronic documents.

A number of systems exist for the creation, editing, management and data mining of electronic business documents (e.g., electronic contracts). Typically, these systems implement only one kind of document type. For example, one known type of system implements a structured document type (e.g., hypertext markup language (HTML) or extensible markup language (XML)) that is easy to parse, insert and modify. Although such document types are well-suited for activities such as electronic contract negotiation online or over a network (e.g., the Internet), the security functions provided thereby are limited.

Other systems have attempted to implement document types that enable tighter security control, such as portable document format (PDF) document types. However, these document types typically allow only limited editing or modification (e.g., line editing), which makes them less well-suited for activities that will include negotiation or revision of documents.

Further systems employ an editor that offers some security features and editing tracking functions, such as certain word processor applications. However, the document types implemented in such systems are not as flexible as structured document types, and the available security features are not as strong as those offered by PDF document types.

Thus, there is a need in the art for a method and apparatus for creating and editing electronic documents.

SUMMARY OF THE INVENTION

In one embodiment, the present invention is a method and apparatus for creating and editing electronic documents. One embodiment of the inventive method involves generating an electronic document in a first document format type, in accordance with one or more user-specified parameters, and converting the electronic document from the first document format type into a second document format type, in accordance with a user instruction to finalize the electronic document. In one embodiment, the first document format type is a structured document format type, such as hypertext markup language or extensible markup language, while the second document format type is a secure document format type such as portable document format.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for efficient electronic document management. The method and apparatus of the present invention provide a flexible, secure environment in which electronic documents such as electronic documents can be created, revised and finalized by one or more parties. Moreover, the present invention provides an efficient system within which to perform data mining applications involving electronic documents.

Figure 1:
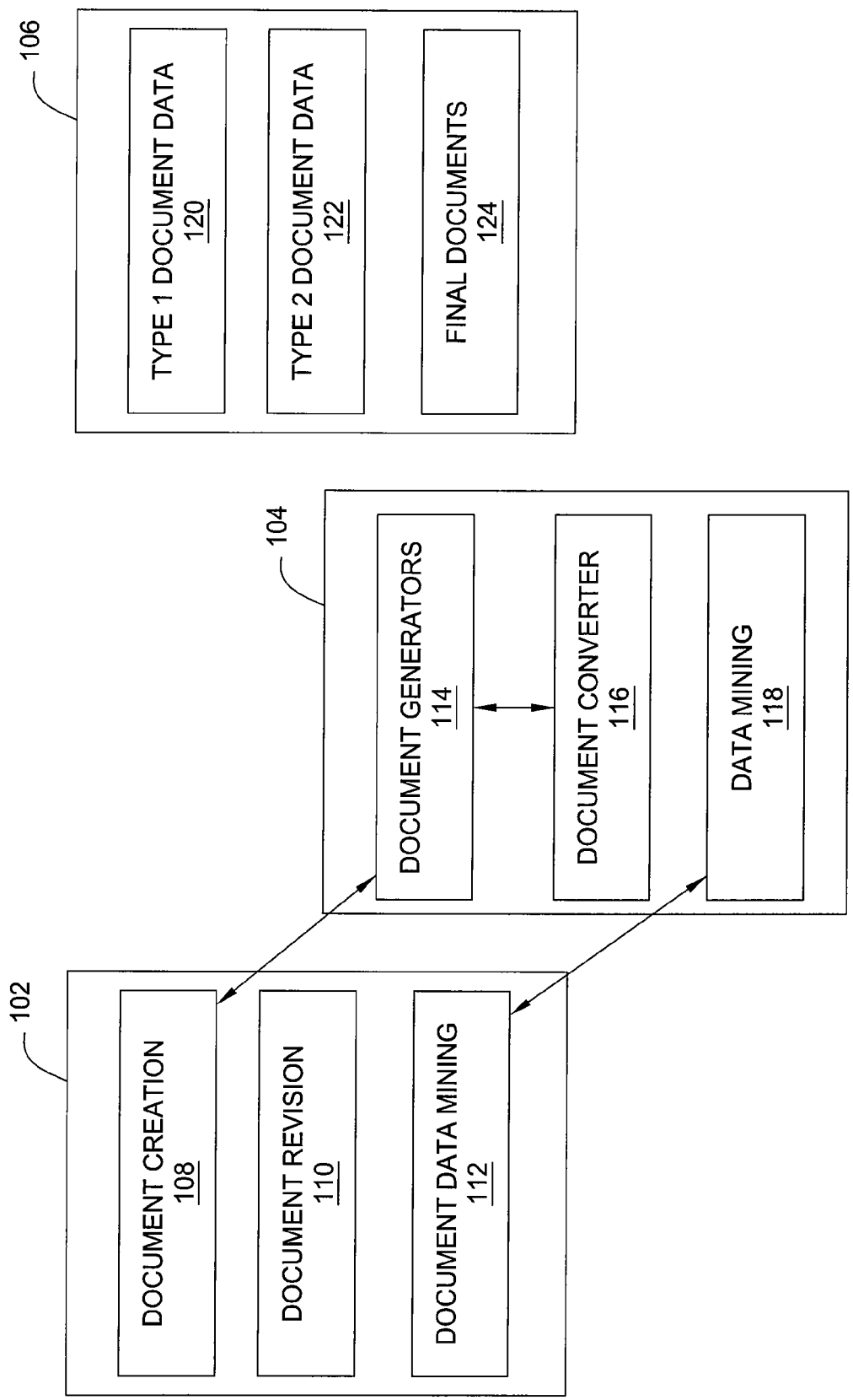
FIG. 1 is a schematic diagram illustrating a document management system, according to one embodiment of the present invention.

FIG. 1 is a schematic diagram illustrating a document management system 100, according to one embodiment of the present invention. The document management system 100 is configured for the creation, editing and mining of electronic documents, such as electronic business documents. The document management system 100 may be configured as a stand-alone application, or as a World Wide Web application. The document management system 100 comprises a client front end 102, an application server 104 and a database 106.

The client front end 102 comprises a document creation module 108, a document revision 110 module and a document data mining module 112. The document creation module 108 enables a user to create an electronic document, such as a version of an electronic contract. The document creation module does this through communication with the application server 104, as described in further detail below. In one embodiment, the document creation module 108 enables the creation of an initial document in a first document type, and of a final document (e.g., a revised version of the initial document) in a second document type. The first document type comprises a structured format that is easy to parse, insert and modify, while the second document type comprises a format having tighter security and better portability than the first document type. In one embodiment, the first document type is XML, while the second document type is PDF.

The document revision module 110 enables the user to revise an electronic document (e.g., created using the document creation module 108). For example, if the electronic document is an electronic contract, the document revision module would enable the user to negotiate the contract by making changes to an initial version of the contact (e.g., created in XML or another structured format type), obtaining approval of the contract by all pertinent parties and retrieving a final version of the electronic contract (e.g., created in a portable and/or secure format type such as PDF) for signature and view.

The document data mining module 112 enables the user to search and analyze previously created electronic documents. In one embodiment, the document data mining module is capable of searching documents of at least the first document type and the second document type (e.g., XML and non-XML/PDF documents, embedded unparsed and PDF entities).

The application server 104 comprises one or more document generator modules 114, a document converter module 116 and a data mining module 118. The document generator modules 114 are in communication with the client front end 102, so that the user working on the client front end 102 can access the document generator modules 114 to generate electronic documents. In one embodiment, the document generator modules 144 generate, based on user-specified parameters, the initial document in the first document type, and the final document in the second document type. Additionally, the application server 104 generates revision (or negotiation) files in the first document type as the initial document is revised by the user(s) into the final document.

The document converter module 116 is in communication with the document generator modules 114 and functions to convert an initial or revised version of a document, which exists in the first document type, into a final version of the document in the second document type. To this end, the document converter module 116 is capable of parsing and separating data of at least the first document type and the second document type. The document converter module 116 is also capable of building relationships between separating data of at least the first document type and the second document type, and generating files that reflect these relationships.

The data mining module 118 is in communication with the document data mining module 112 of the client front end 102. In one embodiment, the data mining module 118 is a generic data mining engine.

In one embodiment, the database 106 is a local file system. In another embodiment, the database 106 is a remote database. The database 106 comprises document data 120 of the first document type, document data 122 of the second document type and final versions 124 of electronic documents. The data 120 of the first document type comprises schema cascading style sheets (CSS) of the first document type, parsed entities and data of the first document type and negotiation files of the first document type. The data 122 of the second document type comprises embedded, unparsed entities of the second document type, other data that is not of the first document type (e.g., multipurpose Internet mail extension (MIME) data), data relationship files (i.e., such as those generated by the document converter module 116 of the application server) and user signature information in the second document type.

The system 100 thereby provides a flexible, secure environment in which electronic documents such as electronic documents can be created, revised and finalized by one or more parties. Documents are created and revised In accordance with a structured document format type, allowing for greater flexibility in the editing process. Once edits have ceased, the system 100 converts the electronic document to a second document format type that affords greater security for the final document (as well as greater portability for sharing/view). Moreover, the present invention provides an efficient system within which to perform data mining applications involving electronic documents.

Figure 2:
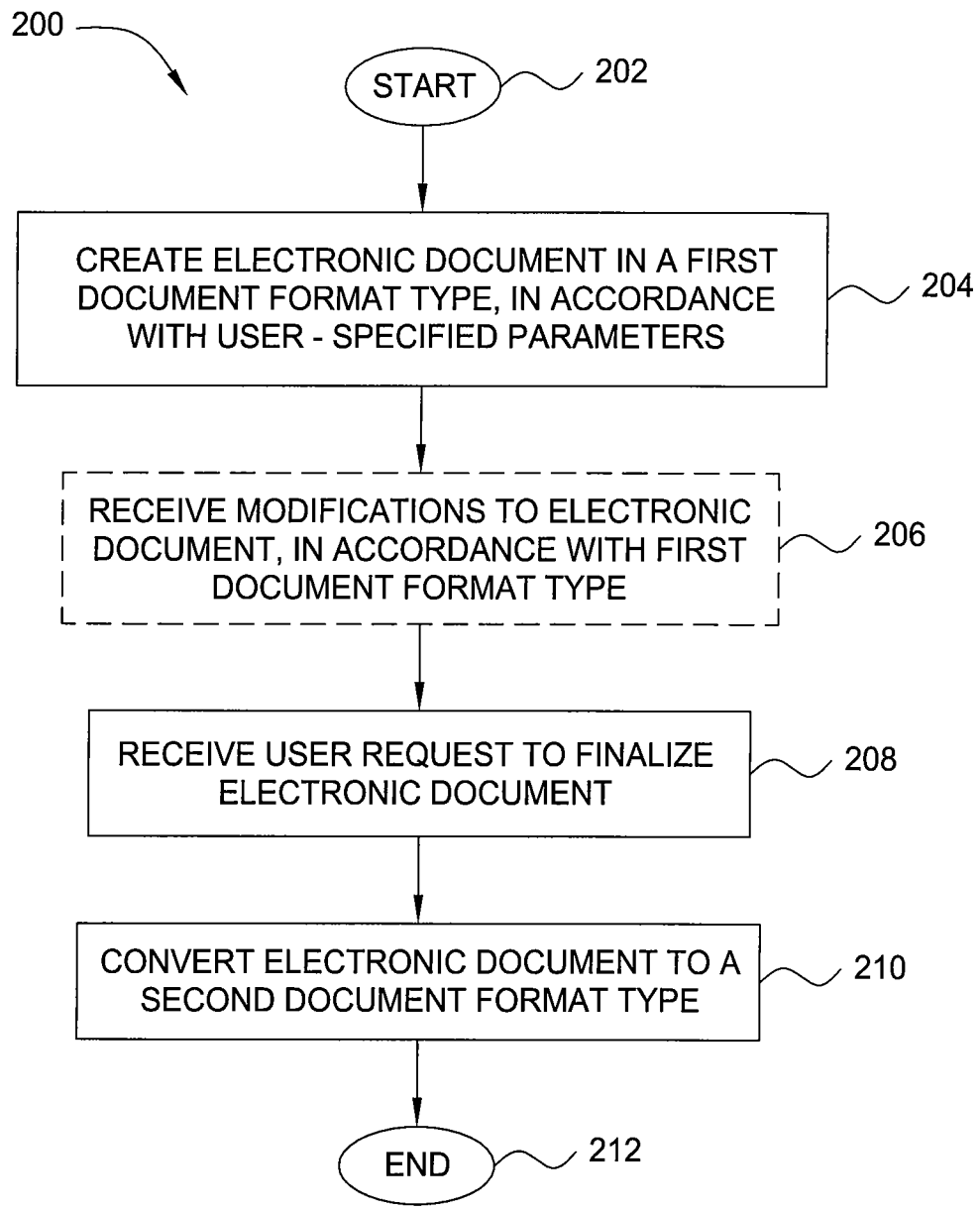
FIG. 2 is a flow diagram illustrating one embodiment of a method for managing electronic documents, according to the present invention.

FIG. 2 is a flow diagram illustrating one embodiment of a method 200 for managing electronic documents, according to the present invention. In particular, the method 200 may be implemented, for example, in an application server that is responsible for generating, editing and converting electronic documents, such as the application server 104 of FIG. 1.

The method 200 is initialized at step 202 and proceeds to step 204, where the method 200 creates an electronic document in a first document format type, in accordance with user-specified parameters. For example, the user-specified parameters may refer to parameters or details to be included in an electronic contract. In one embodiment, the user-specified parameters include at least one of the following: document type (e.g., contract), parties involved in the creation of the document (e.g., parties negotiating a contract), relevant business rules and processes, signature types and data to be reused from one or more previous electronic documents. In one embodiment, resultant electronic document is a template that includes these user-specified parameters, as well as one or more empty or modifiable fields into which the user may input additional details. In one embodiment, the first document format type is a structured document type, such as HTML or XML. One embodiment of a method for creating an electronic document in accordance with step 204 is described in further detail with respect to FIG. 3.

In optional step 206 (illustrated in phantom), the method 200 receives one or more modifications to the electronic document, in accordance with the first document format type. For example, if the electronic document is an electronic contract, the method 200 may receive proposed modifications to the terms of the contract from one or more of the negotiating parties (who may be enumerated in the user-specified parameters). Alternatively, the method 200 may receive additional details from the user that were not provided in the original user-specified parameters.

In step 208, the method 200 receives a user request to finalize the electronic document. That is, the user request indicates that a current form of the electronic document (e.g., a last modified version as received in step 208) is approved.

In step 210, the method 200 converts the electronic document to a second document format type, in response to the user request received in step 208. In one embodiment, the document converter module 116 of the application server 104 performs the conversion. In one embodiment, the second document format type is a secure, portable format type, such as PDF. Accordingly, once finalized, the electronic document is viewable by all parties involved in the creation/editing of the electronic document, but becomes much more difficult to modify further (e.g., further modifications are substantially prevented).

In one embodiment, one or more of the parties involved in the creation/editing of the final electronic document may provide a signature on the electronic document, if required. In this case, the method 400 will generate the requisite signature information file and deposit the signature information file on the database 106. Such a step may also require the temporary removal of security from the final electronic document in order to add the signature and/or a watermark.

The method 200 terminates in step 212.

In one embodiment, the final electronic document is deposited on the database 106 so that is may be retrieved later for viewing, data mining and other applications.

Figure 3:
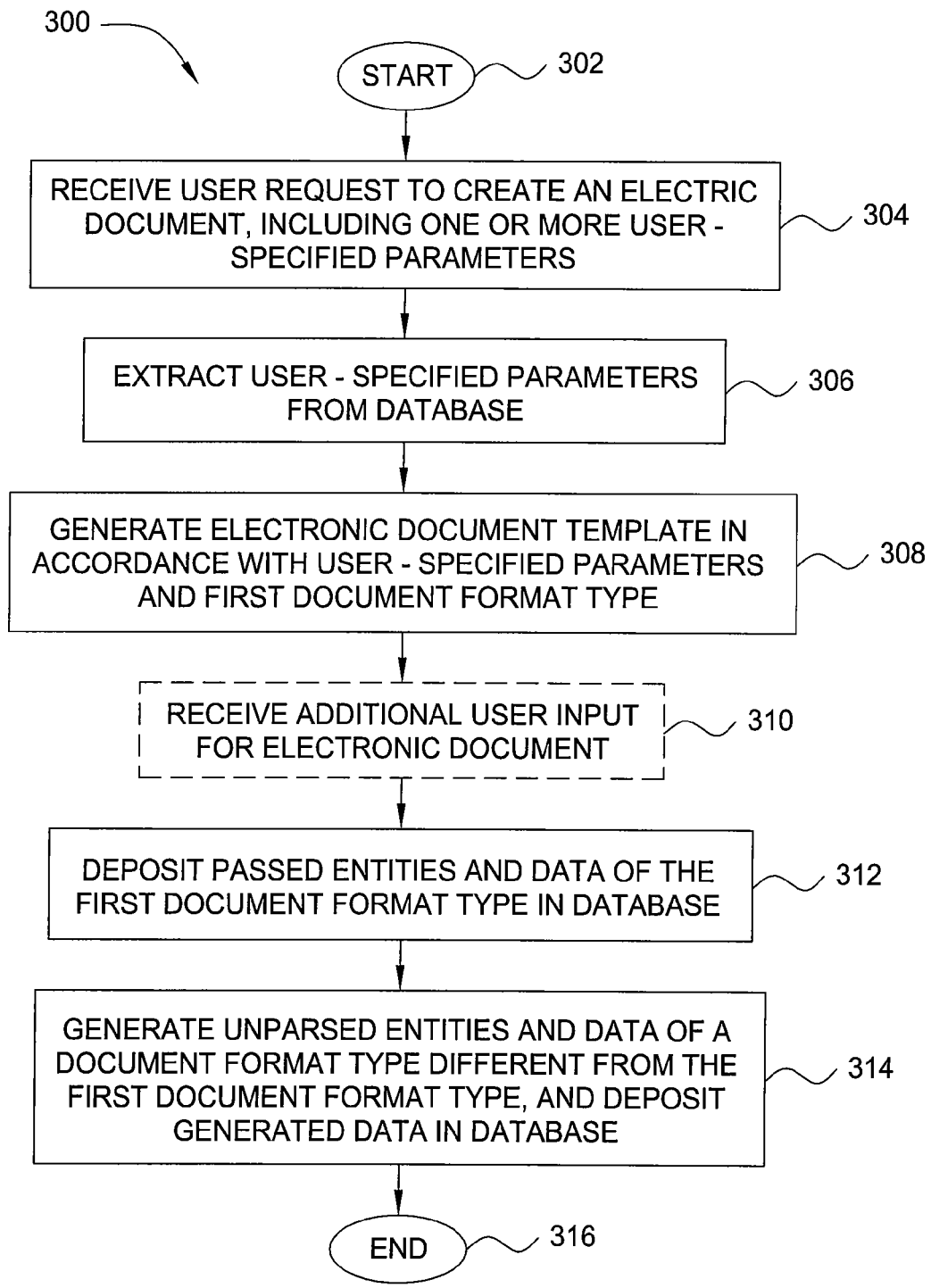
FIG. 3 is a flow diagram illustrating one embodiment of a method for creating an electronic document, according to the present invention.

FIG. 3 is a flow diagram illustrating one embodiment of a method 300 for creating an electronic document, according to the present invention. The method 300 may be implemented, for example, in accordance with step 204 of the method 200.

The method 300 is initialized at step 302 and proceeds to step 304, where the method 300 receives a user request to create an electronic document. In one embodiment, the user request includes one or more user-specified parameters for creating the electronic document, as described above with respect to FIG. 2. In one embodiment, the user-specified parameters are received via the document creation module 108 of the client front end 102.

In step 306, the method 300 extracts the user-specified parameters from the database 106. The method 300 then proceeds to step 308 and generates an electronic document template in accordance with the extracted user-specified parameters. The generated electronic document is generated in the first document format type (e.g., XML).

In optional step 310 (illustrated in phantom), the method 300 receives additional user input for the electronic document. This additional user input includes information that the user wishes to include at least preliminarily in the electronic document, but did not or could not provide in step 304.

In step 312, the method 300 deposits parsed entities and data of the first document format type (e.g., XML data) on the database 106. The method 300 then proceeds to step 314 and generates unparsed entities and data of a document format type that is different from the first document format type (e.g., the second document format type) and deposits the generated unparsed entities and data on the database 106. In one embodiment, the generated unparsed entities and data includes non-XML (e.g., MIME) data such as graphic files (e.g., graphics interchange format (GIF) or joint photographic experts group (JPEG) files).

The method 300 terminates in step 316.

Figure 4:
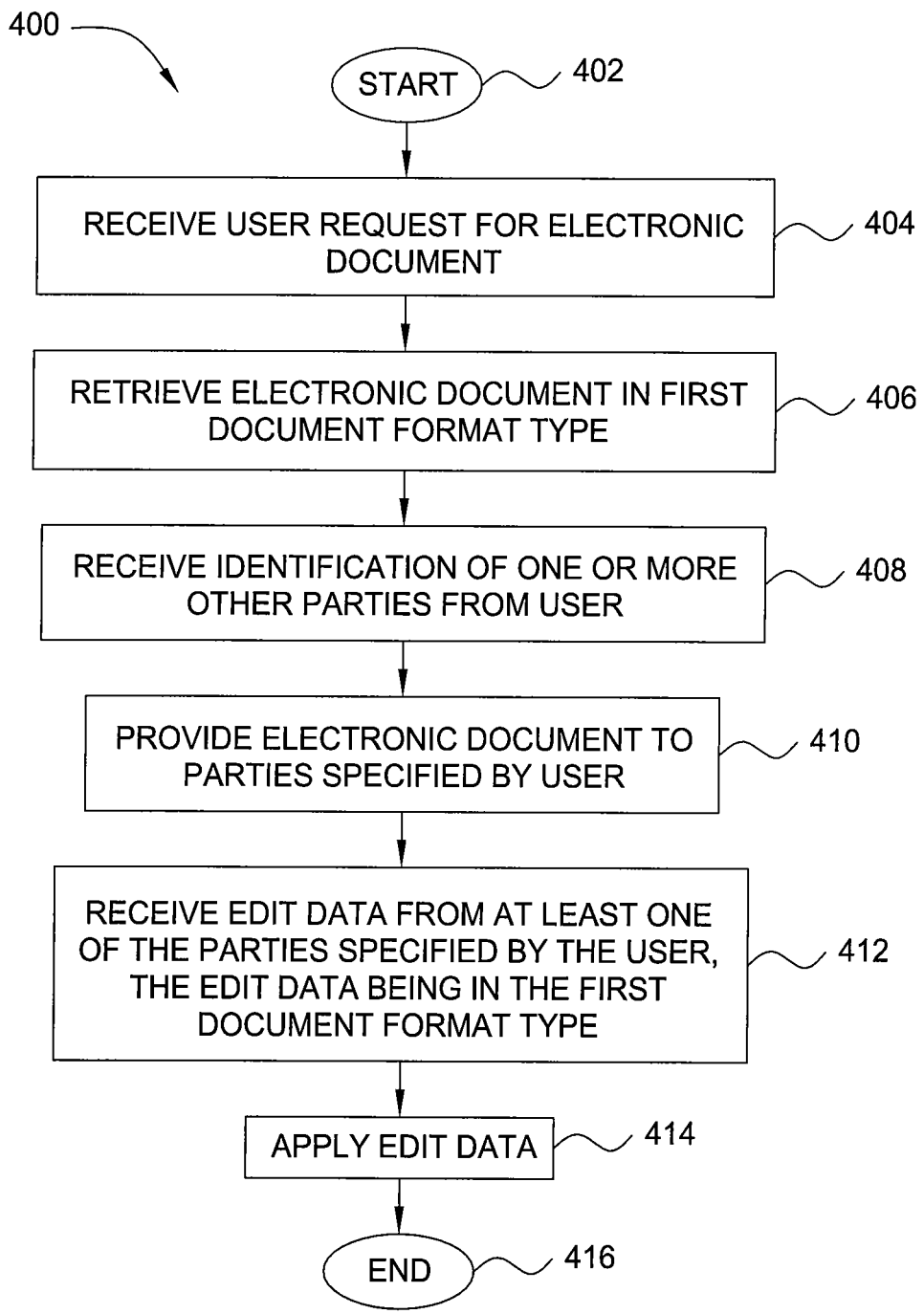
FIG. 4 is a flow diagram illustrating one embodiment of a method for modifying an electronic document, according to the present invention.

FIG. 4 is a flow diagram illustrating one embodiment of a method 400 for modifying an electronic document, according to the present invention. The method 400 may be implemented, for example, in accordance with step 206 of the method 200.

The method 400 is initialized at step 402 and proceeds to step 404, where the method 400 receives a user request for an (existing) electronic document. In one embodiment, the user request for this previously created electronic document is transmitted via the document revision module 110 of the client front end 102, and the electronic document is retrieved from one of the document generators 114 of the application server 104.

In step 406, the method 400 retrieves the requested electronic document, which currently exists in the first document format type (e.g., XML). In one embodiment, retrieval of the requested electronic document includes reconstructing the requested electronic document from parsed entities and data of the first document format type (e.g., the data deposited in the database 106 in step 312 of the method 300), as well as the embedded unparsed entities or data of the second/other document format type (e.g., the data deposited in the database 106 in step 314 of the method 300).

The method 400 then proceeds to step 408 and receives, from the user, the identification of one or more other parties (e.g., via the document revision module 110 of the client front end 102). These other parties are chosen by the user as parties to which the user wishes to provide the requested electronic document. In one embodiment, these parties are also permitted to modify the requested electronic document. In one embodiment, this step also deposits negotiation data of the first document format type in the database 106, for record-keeping purposes.

In step 410, the method 400 provides the requested electronic document to the indicated parties. The method 400 then proceeds to step 412 and received modifications to the requested electronic document (i.e., edit data) from at least one of the indicated parties. The edit data is received in the first document format type (i.e., the electronic document is still in the first document format type).

In step 414, the method 400 applies the edit data, maintaining the modified electronic document in the first document format type until a user requested is received to finalize the electronic document (e.g., in accordance with step 208 of the method 200).

The method 400 terminates in step 416.

Figure 5:
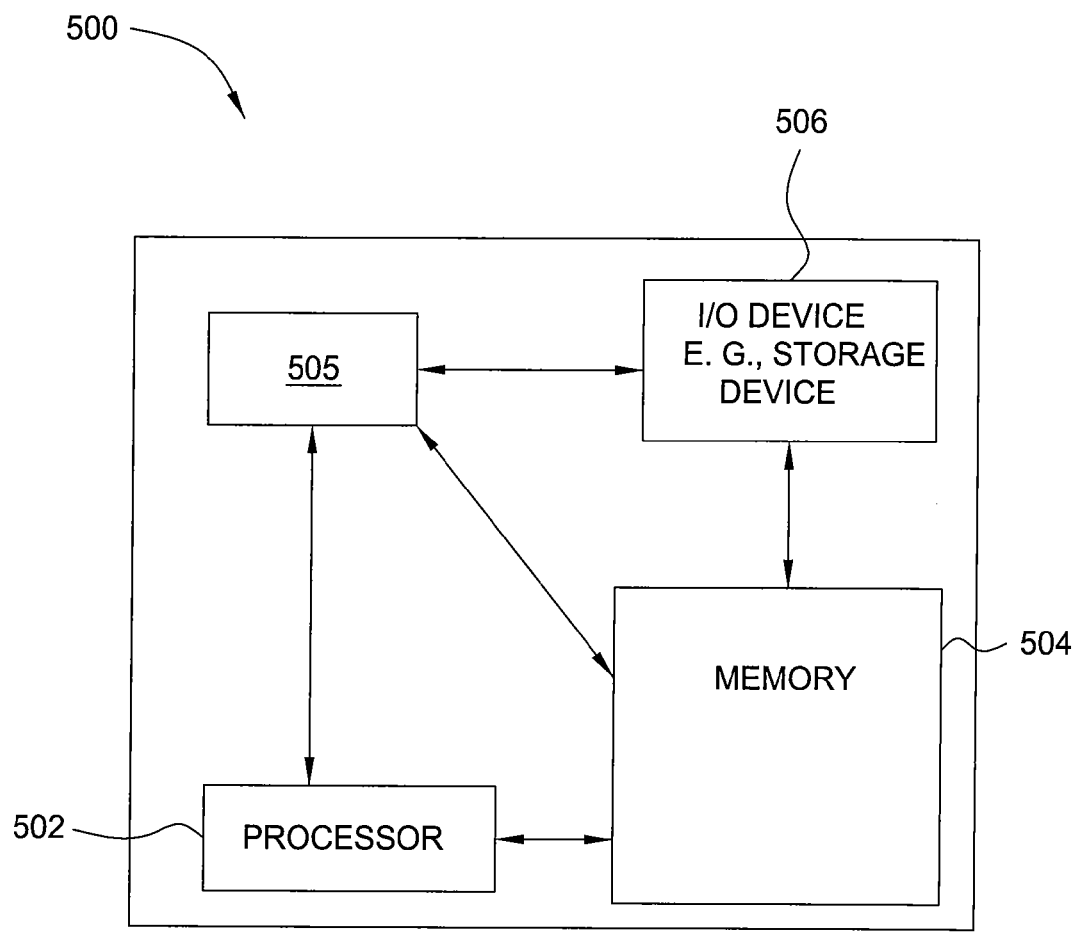
FIG. 5 is a high level block diagram of the present electronic document creation and editing system that is implemented using a general purpose computing device.

FIG. 5 is a high level block diagram of the present electronic document creation and editing system that is implemented using a general purpose computing device 500. In one embodiment, a general purpose computing device 500 comprises a processor 502, a memory 504, an electronic document creator or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the electronic document creator 505 can be implemented as a physical device or subsystem that is coupled to a processor through a communication channel.

Alternatively, the electronic document creator 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the electronic document creator 505 for creating and editing described herein with reference to the preceding Figures can be stored on a computer readable medium or carrier (e.g., RAM, magnetic or optical drive or diskette, and the like).

Thus, the present invention represents a significant advancement in the field of electronic document creation and management. A method and apparatus are provided that enable a user to create, modify and finalize electronic documents, such as electronic contracts within a flexible, secure environment. Moreover, the present invention provides an efficient system for data mining applications involving electronic documents.

While foregoing is directed to the preferred embodiment of the present invention, other and further embodiments of the invention may be devised without departing from the basic scope thereof, and the scope thereof is determined by the claims that follow.

The invention claimed is:

1. A non-transitory computer readable medium containing an executable program for creating electronic documents, where the program performs the steps of:

generating an electronic document in a first document format type, in accordance with one or more user-specified parameters;

converting the electronic document from the first document format type into a second document format type, in accordance with a user instruction to finalize the electronic document, wherein a final version of the electronic document is stored in the second document format type, and wherein the second document format type includes a security feature that prevents modification of the final version of the electronic document; and adding a signature to the final version of the electronic document, the signature identifying a party involved in a creation of the electronic document, wherein the adding comprises:

generating a signature file; and temporarily removing the security feature from the final version of the electronic document while the signature file is added to the final version of the electronic document.

2. A system for creating electronic documents, the system comprising:

hardware means for generating an electronic document in a first document format type, in accordance with one or more user-specified parameters; and hardware means for converting the electronic document from the first document format type into a second document format type, in accordance with a user instruction to finalize the electronic document, wherein a final version of the electronic document is stored in the second document format type, and wherein the second document format type includes a security feature that prevents modification of the final version of the electronic document; and hardware means for adding a signature to the final version of the electronic document, the signature identifying a party involved in a creation of the electronic document, wherein the hardware means for adding comprises:
generating a signature file; and
temporarily removing the security feature from the final version of the electronic document while the signature file is added to the final version of the electronic document.

3. The system of claim 2, further comprising:
a database for storing documents of the first document format type and documents of the second document format type.

4. The system of claim 2, further comprising:
means for performing data mining.

5. A method for creating electronic documents, the method comprising the steps of:

generating an electronic document in a first document format type, in accordance with one or more user-specified parameters;

converting the electronic document from the first document format type into a second document format type, in accordance with a user instruction to finalize the electronic document, wherein a final version of the electronic document is stored in the second document format type, and wherein the second document format type includes a security feature that prevents modification of the final version of the electronic document; and adding a signature to the final version of the electronic document, the signature identifying a party involved in a creation of the electronic document, wherein the adding comprises:
generating a signature file; and
temporarily removing the security feature from the final version of the electronic document while the signature file is added to the final version of the electronic document.

6. The method of claim 5, wherein the one or more user-specified parameters comprise at least one of: a type of the electronic document, one or more parties to be involved in creating the electronic document, one or more relevant business rules, one or more relevant business processes, one or more signature types to be used in accordance with the electronic document type and data to be reused from another electronic document.

7. The method of claim 5, wherein the first document format type is a structured document format type.

8. The method of claim 7, wherein the first document format type is hypertext markup language or extensible markup language.

9. The method of claim 5, wherein the second document format type is a secure document format type.

10. The method of claim 9, wherein the second document format type is portable document format.

11. The method of claim 5, wherein generating comprises:
receiving the user-specified parameters;
extracting the user-specified parameters from a database; and
creating an electronic document template in the first document format type, in accordance with the user-specified parameters.

12. The method of claim 11, further comprising:
depositing one or more parsed entities and data of the first document format type in the database;
generating one or more unparsed entities and data of a document format type that is different from the first document format type; and
depositing the one or more unparsed entities and data of a document format type that is different from the first document format type in the database.

13. The method of claim 5, further comprising:
modifying the electronic document in the first document format type prior to finalizing.

14. The method of claim 13, wherein modifying comprises:
retrieving the electronic document, in accordance with a user request for the electronic document;
receiving edit data from one or more parties authorized to modify the electronic document, in accordance with the first document format type; and
applying the edit data to the electronic document.

15. The method of claim 14, wherein the one or more parties are specified by the user.

16. The method of claim 14, wherein retrieving comprises:
retrieving one or more parsed entities and data of the first document format type from a database;
retrieving one or more unparsed entities and data of a document format type that is different from the first document format type from the database; and
reconstructing the electronic document in accordance with the one or more parsed entities, the data of the first document format type from a database, the one or more unparsed entities and the data of a document format type that is different from the first document format type.

17. The method of claim 5, wherein the generating and the converting are both performed on a single computing device.

* * * * *